Sept. 25, 1962 P. MESHBERG 3,055,560
METERING VALVE ASSEMBLY
Filed May 18, 1959

INVENTOR
Philip Meshberg

BY Johnson and Kline
ATTORNEYS

United States Patent Office 3,055,560
Patented Sept. 25, 1962

3,055,560
METERING VALVE ASSEMBLY
Philip Meshberg, 290 Euclid Ave., Fairfield, Conn.
Filed May 18, 1959, Ser. No. 813,824
5 Claims. (Cl. 222—394)

This invention relates to valves for controlling the discharge of fluids under pressure from a container. More specifically, it pertains to metering valves for dispensing a predetermined quantity of the fluid upon a single operation of the valve.

Prior to this invention, metering valves for dispensing a measured quantity of fluid under pressure have included a valve housing or the like, of predetermined size, which forms the measuring chamber. While units of this type are normally highly efficient, they present the problem of constructing a specific valve unit, or at best a valve housing, for each different dispensing requirement. For example, one valve unit may be adapted to dispense one cubic centimeter of fluid, while another unit will be required if two cubic centimeters are to be dispensed, the volume capacity of each unit being subject to the size of the valve housing or metering chamber.

It will be readily understood that, in accordance with this procedure, increased costs of manufacture will be necessitated and large inventories of different size valve units will have to be maintained. Further, the utilization of a different valve unit for each variation in volume delivery requirements may dictate a change in the size or structure of the fluid container mounting the valve, such as in the size or shape of the valve mounting neck.

The present invention overcomes the problems aforenoted by providing a valve unit of universal utility, which is readily adapted to the delivery of varied measured quantities of fluid, as required.

According to the invention, this is achieved by constructing the valve unit so that the valve housing constitutes a basic measuring chamber and is adapted to mount and be openly connected to an auxiliary chamber for supplementing and increasing the volume of the basic chamber.

It is, therefore, an object of the invention to provide a valve unit which is readily adapted to be utilized in the manufacture and/or assembly of fluid dispensing packages of varied volume delivery ratings.

It is also an object of the invention to provide a valve unit adapted to deliver a basic measured quantity of fluid which may be supplemented by additional means for increasing its potential output.

Another object of the invention is to provide a valve unit, having a valve housing forming a measuring chamber, which may be readily supplemented by the addition of an auxiliary chamber in open communication with the valve housing.

It is a further object of the invention to provide a valve unit including a measuring chamber of a basic volume capacity which is adapted to be manufactured in mass quantities by modern production methods for storage and/or use in assembling fluid dispensing packages and which may readily have its basic capacity supplemented prior to assembly in the package to increase the measured fluid output thereof.

Other objects and advantages of the invention will be apparent from the specification and claims when considered in connection with the attached sheet of drawings, illustrating one form of the invention, wherein like characters represent like parts and in which:

Figure 1:
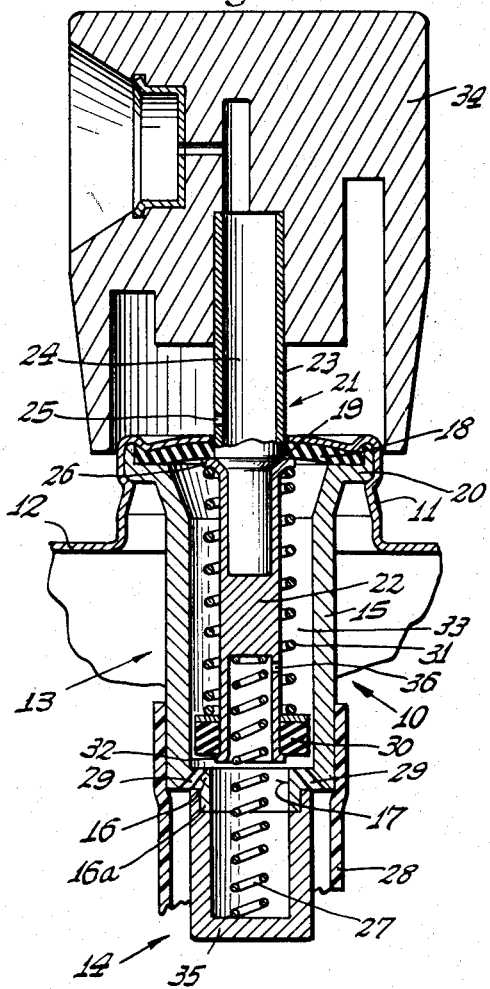
FIGURE 1 is a fragmentary sectional view of a fluid dispensing package having a valve unit embodying the invention and showing the valve in inoperative position.

Referring now to the drawings, a metering valve unit, i.e. a discharge device for a container having a fluid under pressure therein, embodying the invention and generally indicated by the numeral 10, is shown mounted in the neck 11 of a container 12. The valve unit 10, which according to the invention comprises a basic valve unit 13 and an auxiliary unit 14, is adapted to deliver, upon the operation of the valve, a measured quantity of the fluid under pressure from the container. While the invention may be embodied in substantially all of the metering valves presently known to the art, in the illustrated form of the invention the basic valve unit 13 comprises a tubular valve housing 15 having a transverse wall 16 in the inner end thereof formed with a neck 16a and provided with a central aperture 17. A resilient valve disk 18 having a bore 19 therethrough is mounted in the other end of housing 15 and forms the outer end thereof. The area between the resilient valve disk 18 and transverse wall 16 defines a metering chamber of a predetermined size. The housing 15 is formed at its outer end with a shoulder 20 which is adapted to seat the resilient valve disk and be crimped into the neck 11 of the container 12 for mounting the valve unit.

A valve stem 21, which includes an inner stem portion 22 and an outer stem portion 23 is mounted in valve housing 15 with the outer stem portion extending through the bore in the valve disk and projecting beyond the container. The outer portion 23 of the valve stem is provided with a longitudinal passage 24 in the outwardly projecting portion thereof which communicates with a lateral passage 25 disposed adjacent the outer face of the valve disk 18. The inner portion of valve stem 21, which may be removably connected by a press fit or the like to the outer stem portion 23, is formed at its upper end adjacent valve disk 18 with a flange or sealing portion 26 for engaging the inner face of the valve disk to seal the housing to the atmosphere. Resilient means in the form of a coil spring 27 or the like biases valve stem 21 upwardly in its outwardly projecting or inoperative position thereby forcing sealing portion 26 of inner valve stem portion 22 into engagement with the inner face of the valve disk to seal the housing.

The valve housing 15, which according to conventional practice carries a dip tube 28 or the like, is provided with spaced inlet ports 29 in the transverse wall 16 for communicating the interior of the housing with the container whereby the housing is filled with fluid under pressure from the container. The inner portion 22 of valve stem 21 slidably carries a second resilient valve disk 30 which is adapted to close off inlet ports 29 and break communication between the interior of the housing and the container when the valve stem is depressed to operate the valve. The disk 30 is normally biased toward the inner end of the valve stem by resilient means such as a coil spring 31 or the like and is retained against separation from the stem by means of an outwardly turned flange 32 formed integral with the inner portion 22 of the stem.

At this point we should pause to consider basic valve unit 13, above described, which for purposes of explanation we will assume has a one cubic centimeter capacity. If the basic valve unit is to be utilized by itself in dispensing fluids from the container 12, an end cap or a plug (not shown) will be engaged with neck 16a of the valve housing for closing the aperture 17. With the basic valve unit in this condition, a metering chamber 33, of one cubic centimeter volume, is defined within the housing. When the valve stem is in its inoperative position (see FIG. 1), that is with the outer stem portion 23 projecting outwardly of the container so that the lateral passage 25 is disposed adjacent the outer surface of valve disk 18, fluid under pressure flows into measuring chamber 33 through inlet ports 29 to fill the chamber so that on the operation of the valve a metered quantity of the fluid is dispensed. After the metering chamber 33 has been filled with a fluid and it is desired to dispense the same, valve stem 21 is depressed or shifted into the valve housing (see FIG. 2) so that valve disk 30 carried by inner valve stem portion 22 closes inlet ports 29 to break communication between the interior of the valve housing and the container. Continued depression of the valve stem shifts lateral passage 25 through bore 19 of the resilient valve disk into the valve housing so that the interior thereof is communicated with the atmosphere. In this manner the fluid within the valve housing is dispensed through lateral passage 25, longitudinal passage 24 in the outer valve stem and the passages formed in the operating button 34 carried by the outer valve stem portion. It should here be noted that the resilient mounting of valve disk 30 enables the disk to slide upwardly on inner valve stem portion 22 as the valve stem is depressed, thereby facilitating the operation of the valve while maintaining a tight seal over the inlet ports.

It will be readily understood that when utilizing the basic valve unit 13, for dispensing fluid from a container only a single predetermined quantity of fluid, such as one cubic centimeter thereof, will be dispensed upon the operation of the valve and this quantity will always be the same unless the valve housing is enlarged or a different valve unit having a different capacity is substituted in its place.

Figure 2:
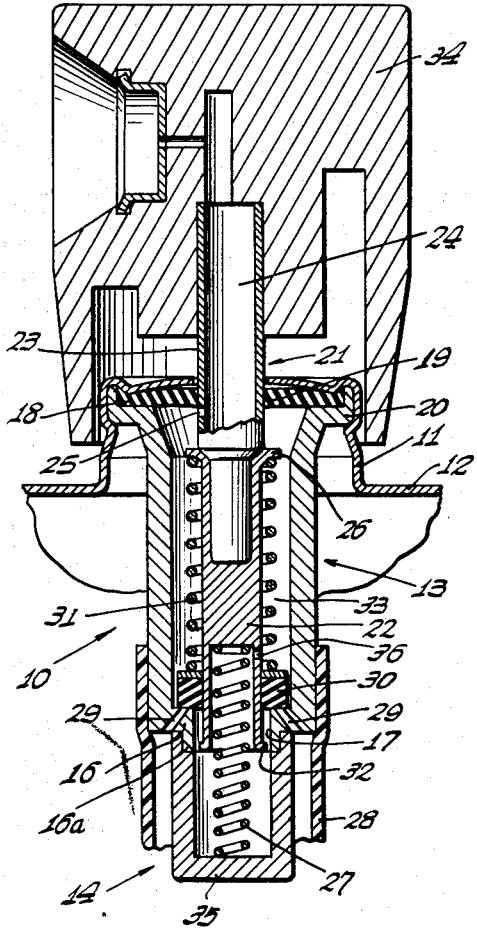
FIG. 2 is a view similar to FIG. 1, but showing the valve unit in operating position.
Figure 3:
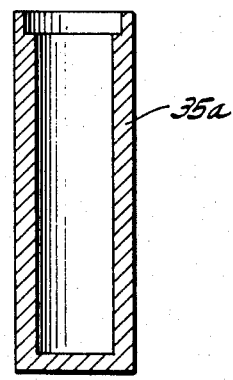
FIG. 3 is an elevational view, in section, of an auxiliary measuring chamber.

The present invention solves this problem and eliminates the necessity of manufactures and dispensing package assemblers maintaining large quantities of valves of different capacities by providing an auxiliary measuring chamber to supplement the measuring chamber formed by the valve housing. According to the invention, an auxiliary chamber 35 is mounted on neck 16a of valve housing 15, in place of the end cap or plug previously mentioned, for supplementing the measuring chamber 33. While the auxiliary chamber may be connected to the valve housing by threaded means or the like, in the illustrated form of the invention a simple press fit is utilized. It will be understood that the auxiliary chamber may be of any size within the limits prescribed by the size of the dispensing package and, therefore, may increase the dispensing capacity of the valve unit to any extent necessary for a particular operation. In FIGS. 1 and 2 for example, an auxiliary chamber 35 is shown which may have a capacity of one third of a cubic centimeter, thereby enabling the valve 10 to dispense 1⅓ cubic centimeters of fluid. The auxiliary chamber 35a shown in FIG. 3 may have a one cubic centimeter capacity, which when mounted on the valve housing 15 will double the capacity of the valve unit.

In the operation of valve unit 10, having auxiliary chamber 35 connected thereto, fluid as previously described flows into the valve from the container through inlet ports 29 to fill the measuring chamber 33 and auxiliary chamber 35. When it is desired to thereafter dispense the fluid, the valve stem 34 is depressed in the normal manner so that valve disk 30 closes inlet ports 29 and thereafter lateral passage 25 communicates the interior of the valve housing with the atmosphere. When the interior of the valve housing is opened to the atmosphere the fluid flows from measuring chamber 33 and auxiliary chamber 35 outwardly along the previously described path. In order to facilitate the discharge of fluid from auxiliary chamber 35 to measuring chamber 33 so that it may thereafter be dispensed, means in the form of an orifice 36 is provided in inner valve stem portion 22 to communicate the auxiliary chamber with the measuring chamber when valve disk 30 engages transverse wall 16.

Valve unit 10, which by means of the invention is adapted to deliver any quantity of fluid desired, may be utilized in pressure filling container 12 according to the method disclosed in my copending application Serial Number 780,477, filed December 15, 1958.

Thus, among others, the several objects of the invention as aforenoted are achieved. Obviously, numerous changes in the structure may be resorted to without departing from the spirit of the invention as defined by the claims.

I claim:

1. A metering valve assembly for controlling the discharge of a measured amount of fluid under pressure from a container comprising a valve housing having a transverse wall at the inner end thereof provided with a central aperture and a resilient valve disk having a bore mounted in the other end, said housing forming a measuring chamber and having an auxiliary chamber connected thereto to form a supplement to the measuring chamber, means mounting the housing on a container, a valve stem mounted in said housing and having a portion extending through said bore in the valve disk and projecting beyond the container, said stem having a longitudinal passage in the projecting portion communicating with a lateral passage disposed adjacent the outer face of the valve disk, resilient means urging the stem into projecting position with the lateral passage adjacent the outer face of the disk and into sealing relation with the disk, movement of said stem against the urging means a predetermined distance from normal sealing position causing said lateral passage to be moved into communication with the housing, said housing having inlet ports in said wall adapted to communicate said housing and auxiliary chamber with said container and the lower portion of said stem having a second valve disk slidable thereon and means for urging said second disk downwardly on the stem, said disk being moved into sealing relation with the inlet ports in said wall to seal the housing and auxiliary chamber from the container prior to the communication of the passage in the outer stem with the housing, the lower portion of the stem having a passage therein to conduct fluid in the auxiliary chamber to the housing when the second valve disk closes off the inlet ports, whereby the measured amount of fluid is dispensed from the housing.

2. A metering valve assembly for controlling the discharge of a measured amount of fluid under pressure from a container comprising a tubular valve housing having a transverse wall at the inner end thereof provided with a central aperture and a resilient valve disk having a bore mounted in the other end, said housing forming a measuring chamber and having a separate auxiliary chamber mounted on and connected thereto to form a supplemental measuring chamber, means mounting the housing on a container, a valve stem mounted in said housing and having a portion extending through said bore in the valve disk and projecting beyond the container, said stem having a longitudinal passage in the projecting portion communicating with a lateral passage disposed adjacent the outer face of the valve disk and a sealing portion cooperating with the disk to seal the container, and means urging the sealing portion of the stem into sealing relation with the disk, movement of said stem against the urging means a predetermined distance from normal sealing position causing said sealing portion to be moved out of sealing relation and said lateral passage to be moved into communication with the housing, said housing having inlet ports in said wall adapted to communicate said housing and auxiliary chamber with said container and the lower portion of said stem having a second valve disk slidable thereon and means for urging said second disk downwardly on the stem, said disk being moved into sealing relation with the inlet ports in said wall to seal the housing and auxiliary chamber from the container prior to the communication of the passage in the outer stem with the housing, the lower portion of the stem having a passage therein to conduct fluid in the auxiliary chamber to the housing when the second valve disk closes off the inlet ports, whereby the measured amount of fluid is dispensed from the housing.

3. A metering valve assembly for controlling the discharge of a measured amount of fluid under pressure from a container comprising a tubular valve housing having a transverse wall at the inner end thereof provided with a central aperture and a resilient valve disk having a bore mounted in the other end, said housing forming a measuring chamber and having a neck projecting from the transverse wall at the inner end and a separate auxiliary chamber mounted on and connected to said neck to form a supplemental measuring chamber, means mounting the housing on a container, a valve stem mounted in said housing and having a portion extending through said bore in the valve disk and projecting beyond the container, said stem having a longitudinal passage in the projecting portion communicating with a lateral passage disposed adjacent the outer face of the valve disk and a sealing portion cooperating with the disk to seal the container, and means urging the sealing portion of the stem into sealing relation with the disk, movement of said stem against the urging means a predetermined distance from normal sealing position causing said sealing portion to be moved out of sealing relation and said lateral passage to be moved into communication with the housing, said housing having inlet ports in said wall adapted to communicate said housing and auxiliary chamber with said container and the lower portion of said stem having a second valve disk slidable thereon and means for urging said second disk downwardly on the stem, said disk being moved into sealing relation with the inlet ports in said wall to seal the housing and auxiliary chamber from the container prior to the communication of the passage in the outer stem with the housing, the lower portion of the stem having a passage therein to conduct fluid in the auxiliary chamber to the housing when the second valve disk closes off the inlet ports, whereby the measured amount of fluid is dispensed from the housing.

4. A metering valve assembly unit for controlling the discharge of a measured amount of fluid under gas pressure from a container including a valve housing providing a measuring chamber adapted to provide a basic volume of fluid, a separate auxiliary measuring chamber secured to the outside of said housing, inlet means normally communicating the measuring chamber and the separate auxiliary measuring chamber to the container to receive fluid therefrom, and valving means movable from a normal position to discharge position for closing said inlet means to seal off said chambers and retain a measured quantity of fluid in each of said chambers and thereafter communicating said measuring chamber with the atmosphere, said valve means also including means for communicating said auxiliary chamber with said measuring chamber when the valve is in discharge position and the measuring chamber is communicated to the atmosphere to supplement the fluid in the measuring chamber, the size of the auxiliary chamber determining the amount of supplemental fluid to be added to the basic volume to produce the measured amount of fluid to be discharged.

5. A metering valve assembly unit for controlling the discharge of a measured amount of fluid under gas pressure from a container comprising a valve housing having a transverse wall at an inner end thereof provided with an aperture and resilient means at the other end having a bore opening outwardly of the housing, said housing forming a measuring chamber, a separate auxiliary chamber connected to the wall of the housing adjacent the aperture therein to form a supplement to the measuring chamber, means mounting the housing on a container, inlet means in said wall for communicating both said measuring chamber and auxiliary chamber with said container, a valve stem mounted in said housing and having a portion extending through said bore and beyond said container, means operated by said stem for valving off the inlet means and disconnecting communication of said measuring chamber and auxiliary chamber from said container and sealing the aperture in the wall between said chambers, and means operated by said valve stem for communicating the measuring chamber to the atmosphere and said sealed-off auxiliary chamber to the measuring chamber subsequent to valving off said inlet means.

References Cited in the file of this patent

UNITED STATES PATENTS

| | | |
|---|---|---|
| 1,733,310 | Manley | Oct. 29, 1929 |
| 1,834,628 | Marshall et al. | Dec. 1, 1931 |
| 1,957,962 | Hyatt | May 8, 1934 |
| 2,693,983 | Howell | Nov. 9, 1954 |
| 2,701,163 | Teller et al. | Feb. 1, 1955 |
| 2,721,010 | Meshberg | Oct. 18, 1955 |
| 2,837,249 | Meshberg | June 3, 1958 |
| 2,892,576 | Ward | June 30, 1959 |